(12) United States Patent
Cinelli et al.

(10) Patent No.: US 8,195,567 B2
(45) Date of Patent: Jun. 5, 2012

(54) METHODS AND SYSTEMS FOR PROVIDING SCANNED MAIL DELIVERY CHANNEL AND AUTOMATIC PAYMENT OF REPLY MAIL

(75) Inventors: Thomas J. Cinelli, Paeonian Springs, VA (US); Gary C. Reblin, Falls Church, VA (US)

(73) Assignee: The United States Postal Service, Washington, DC (US)

( * ) Notice: Subject to any disclaimer, the term of this patent is extended or adjusted under 35 U.S.C. 154(b) by 0 days.

(21) Appl. No.: 11/812,932

(22) Filed: Jun. 22, 2007

(65) Prior Publication Data
US 2008/0033875 A1 Feb. 7, 2008

Related U.S. Application Data

(63) Continuation of application No. 11/592,134, filed on Nov. 3, 2006, now abandoned.

(60) Provisional application No. 60/734,280, filed on Nov. 8, 2005, provisional application No. 60/771,027, filed on Feb. 8, 2006.

(51) Int. Cl.
*G06Q 40/00* (2012.01)
(52) U.S. Cl. .......................................... 705/40; 705/35
(58) Field of Classification Search .................. 705/35, 705/40, 64
See application file for complete search history.

(56) References Cited

U.S. PATENT DOCUMENTS

| | | | |
|---|---|---|---|
| 5,917,965 A | 6/1999 | Cahill et al. | |
| 6,747,749 B1 * | 6/2004 | Pollard et al. | 358/1.1 |
| 7,317,823 B1 | 1/2008 | Price et al. | |
| 2004/0019605 A1 * | 1/2004 | Keown et al. | 707/104.1 |
| 2004/0111368 A1 * | 6/2004 | Cuthbertson et al. | 705/40 |
| 2004/0230523 A1 * | 11/2004 | Johnson | 705/40 |
| 2005/0065893 A1 * | 3/2005 | Josephson | 705/64 |
| 2006/0212391 A1 * | 9/2006 | Norman et al. | 705/40 |

OTHER PUBLICATIONS

Scan and Deliver—New Concept in Mail Delivery, available at http://www.pc-security.com/mailsolutions/scan_&_deliver.htm (printed Jan. 12, 2005, last modified May 5, 2004), pp. 1-3, Datamation Systems Inc.

* cited by examiner

*Primary Examiner* — Elizabeth Rosen
(74) *Attorney, Agent, or Firm* — Finnegan, Henderson, Farabow, Garrett & Dunner, LLP

(57) ABSTRACT

Exemplary systems and methods eliminate a check or a remittance stub from a bill payment process, which may simplify the bill payment process for consumers, providers, and check processing systems. A delivery service provider receives a delivery item at a delivery processing center. It is determined that an account associated with the delivery item is designated for electronic payment. Contents of the delivery item are scanned, and converted into electronic data, which is made available to a biller.

19 Claims, 10 Drawing Sheets

Ms. Jones,

Your outstanding balance is $100.00.                          ⌒ 204

A minimum payment of $50.00 is due by January 31, 2007.

Ms. Jones, Thanks for using this convenient way to pay your bill. We appreciate you as our customer! Select your payment choices.                          ⌒ 206

220 — ☐ Pay in full

220 — ☐ Pay minimum payment

220 — ☒ Specify amount  | 5 | 0 . 0 | 0 |   ⌒ 230

220 — ☒ Pay on | 1 | 15 | 07 |   ⌒ 240

220 — ☒ Send me brochure on new services!

FIG. 3

METHODS AND SYSTEMS FOR PROVIDING SCANNED MAIL DELIVERY CHANNEL AND AUTOMATIC PAYMENT OF REPLY MAIL

This application is a continuation of application Ser. No. 11/592,134, filed Nov. 3, 2006 now abandoned, which claims the benefit of priority of Provisional Application No. 60/734,280, filed Nov. 8, 2005, and Provisional Application No. 60/771,027, filed Feb. 8, 2006, all of which are incorporated by reference in their entirety.

TECHNICAL FIELD

This disclosure relates to the field of bill payment. More particularly, the disclosure involves methods and systems for simplifying a bill payment process using electronic scanning.

BACKGROUND

Consumer bill payments are frequently required on a recurring basis, such as the end of each month. Typically, a consumer receives one invoice each month, and pays the invoice with one check, every month, over a period of years. Examples of regular and recurring bills include rent or mortgage bills, utility bills (such as electricity, telephone, or cable television service), credit card bills, and bills for personal services. In typical systems, bill processing may begin with the biller creating a bill or statement, which may be called a remittance document, that has a detachable portion or remittance stub. A remittance stub is designed to be returned with the consumer's payment so that a employee of the biller may associate the payment with the consumer's account and process the payment.

Typically, when a consumer receives the bill, the consumer must open each bill envelope, review the remittance document, write a check for the proper amount, detach and complete a remittance stub, insert the check and the remittance stub into a reply envelope, and mail the envelope. This process may be time consuming for the consumer, and may result in errors in processing the payment because of the multiple pieces or paper involved. Therefore, it is desirable to provide methods and systems for more rapid, efficient, and accurate bill payment processing.

BRIEF DESCRIPTION OF THE DRAWINGS

FIG. 3 is an exemplary remittance document;

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Exemplary systems and methods may provide for electronic delivery of delivery items such as bill payments, and may eliminate a check or a remittance stub from a consumer's bill payment process. This, in turn, may simplify the bill payment process for the consumer, a delivery service provider, a biller, and a check processing system.

Figure 1:
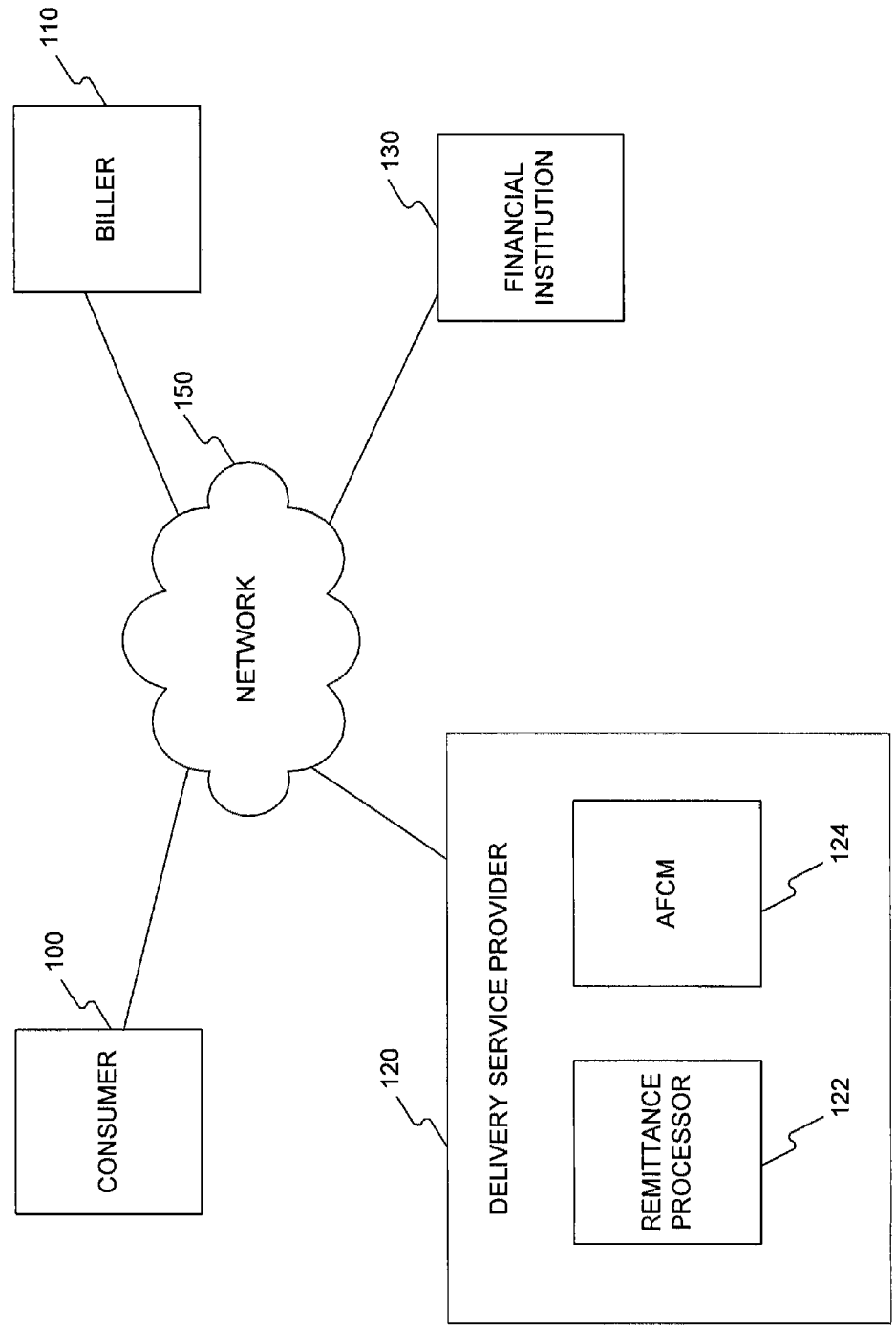
FIG. 1 is a diagram of an exemplary system for processing electronic payments.

FIG. 1 illustrates a diagram of an exemplary system for providing electronic bill payment. As shown in FIG. 1, a consumer 100, a biller 110, a delivery service provider 120, and a financial institution 130 may be connected via a network 150. Consumer 100 may include any recipient of delivery items, such as, for example, a magazine customer. Biller 110 may include any individual or company that provides services or products to consumers, such as a magazine distribution company. Delivery service provider 120 may include any service that distributes delivery items (e.g., mail pieces, packages, etc.), such as, for example, the United States Postal Service™. In certain embodiments, delivery service provider 120 may include a remittance processor 122. Remittance processor 122 may, in certain embodiments, include a machine to automatically process remittances, but may also include a human being to manually process remittances and other documents or operate the remittance processor machine. One skilled in the art will recognize that remittance processor 122 may also include other known systems for processing remittances. Delivery service provider 120 may also include an advanced facer canceler machine ("AFCM") 124, known to one skilled in the art, as well as optical character reader machines, scanning systems, bar-code sorting machines, and digital bar-code sorting machines for processing letters, for example. Financial institution 130 may be a bank or other financial provider (e.g., credit card company or collections agency). The composition and protocol of network 150 is not critical, as long as it allows for communication of information between consumer 100, biller 110, delivery service provider 120, and financial institution 130. In certain embodiments, network 150 may be the Internet, a telephone network, or a United States Post Office™ postal network.

Figure 2:
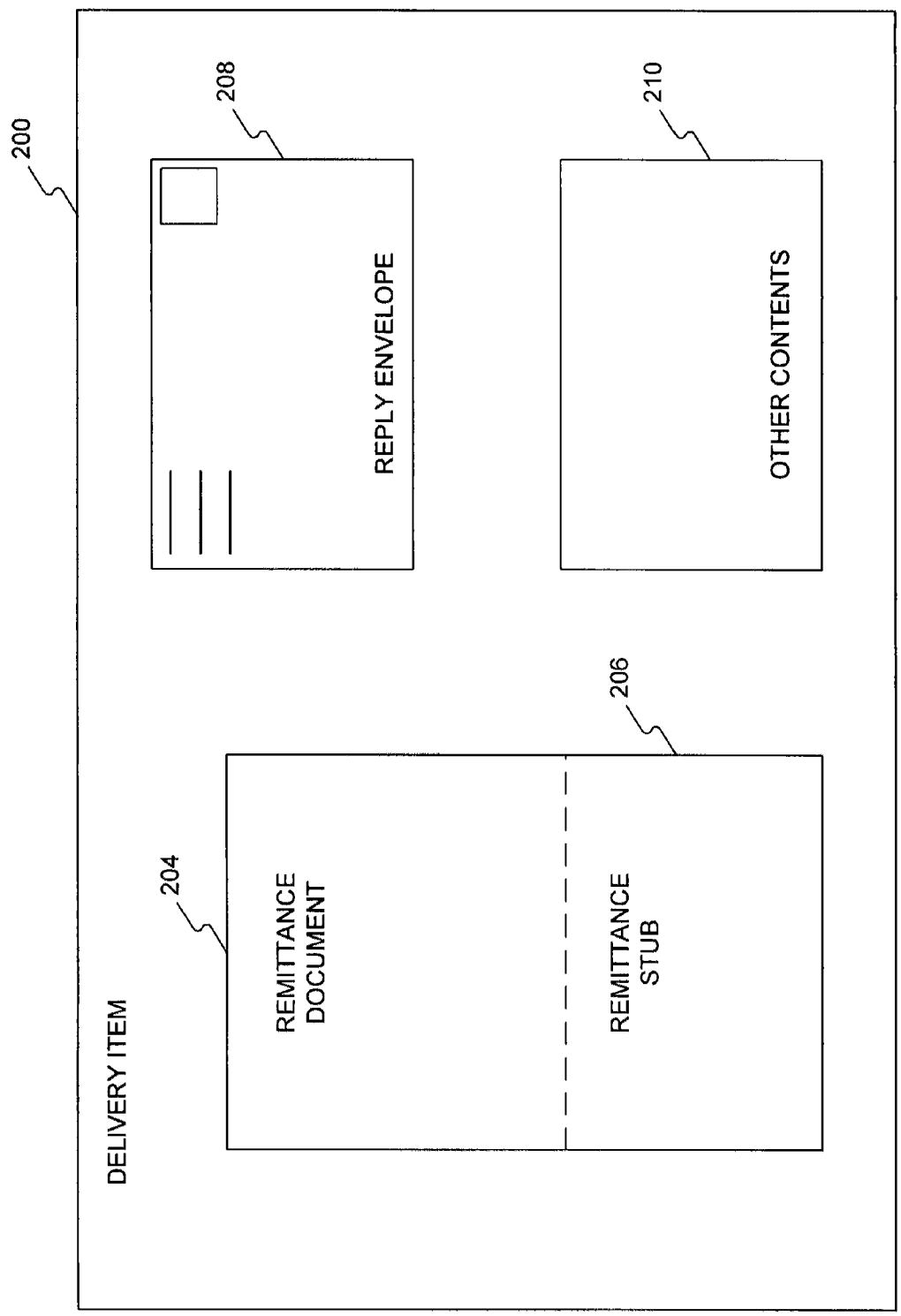
FIG. 2 is an exemplary delivery item.

FIG. 2 illustrates an exemplary delivery item 200 that biller 110 may send to consumer 100, for example via network 150. Delivery item 200 may, in certain embodiments, include a remittance document 204 with a detachable remittance stub 206, a reply envelope 208, and other contents 210, such as letters, advertisements, or coupons, for example. In one example, remittance document 204 is a bill for magazine services. Consumer 100 may use remittance stub 206 and reply envelope 208 to pay the magazine bill, for example using methods described in more detail below with respect to FIGS. 3-11. In one embodiment, reply envelope 208 may include a facing identification mark ("FIM"). The FIM may be used to "face" (that is, direct) reply envelope 208 as it is processed through AFCM 124 at delivery service provider 120. In other embodiments, reply envelope 208 may include a barcode, such as a ZIP CODE™, a return address, a stamp, or a barcode supplied by biller 110, such as a 4-BC Barcode™. A barcode on reply envelope 208 may also include other identification information, such as a number or code associated with biller 110, and a consumer's account number, for example. In yet another embodiment, reply envelope 208 may be a Courtesy Reply Mail™ envelope. One skilled in the art will recognize that many alternative configurations of delivery item 200 are possible. For example, in one embodiment, delivery item 200 may be only a single reply card, such as a postcard, instead of remittance document 204, remittance stub 206, reply envelope 208, and other contents 210.

FIG. 3 illustrates an exemplary remittance document 204 and remittance stub 206. As shown in FIG. 3, in certain embodiments, remittance document 204 may contain a detachable remittance stub 206, which may be customized or designed by biller 110. Remittance document 204 may, in certain embodiments, include an outstanding balance, minimum payment required, deadline, and other information. As shown in FIG. 3, remittance stub 206 may include a series of checkboxes 220, which may be checked by consumer 100 to indicate preferences for paying the bill, or for requesting other services, for example. One skilled in the art will recognize that many alternative designs of remittance stub 206 is possible as long it allows for communication of information between consumer 100 and a recipient (e.g., biller 110, delivery service provider 120, and financial institution 130). In addition, the use of five checkboxes 220 is merely for illustration, and does not limit remittance stub 206 to the use of a particular number of checkboxes.

By selecting checkbox 220 and marking other responses, consumer 100 may customize a response. For example, remittance stub 206 may allow consumer 100 to pay a magazine bill by marking such options as: "Pay in Full," "Pay the Minimum Due," "Specify Amount," "Pay On (Date)," and "Send me brochure on new services!", etc. Remittance stub may include an amount 230 to be paid, which may be predetermined by biller 110, or may be entered by the consumer 100. Remittance stub 206 may also include an entry for a date 240, which may be the date the payment is to be processed. In one example, if date 240 is left blank, a recipient such as financial institution 130 may process a payment upon receipt of remittance stub 206. In another example, if the amount 230 is left blank, a recipient may process a payment for the minimum amount due, or may return remittance stub 206 to consumer 100. In one embodiment (not shown), consumer 100 may designate an account from which to withdraw payment and the date for the withdrawal of payment.

Figure 4:
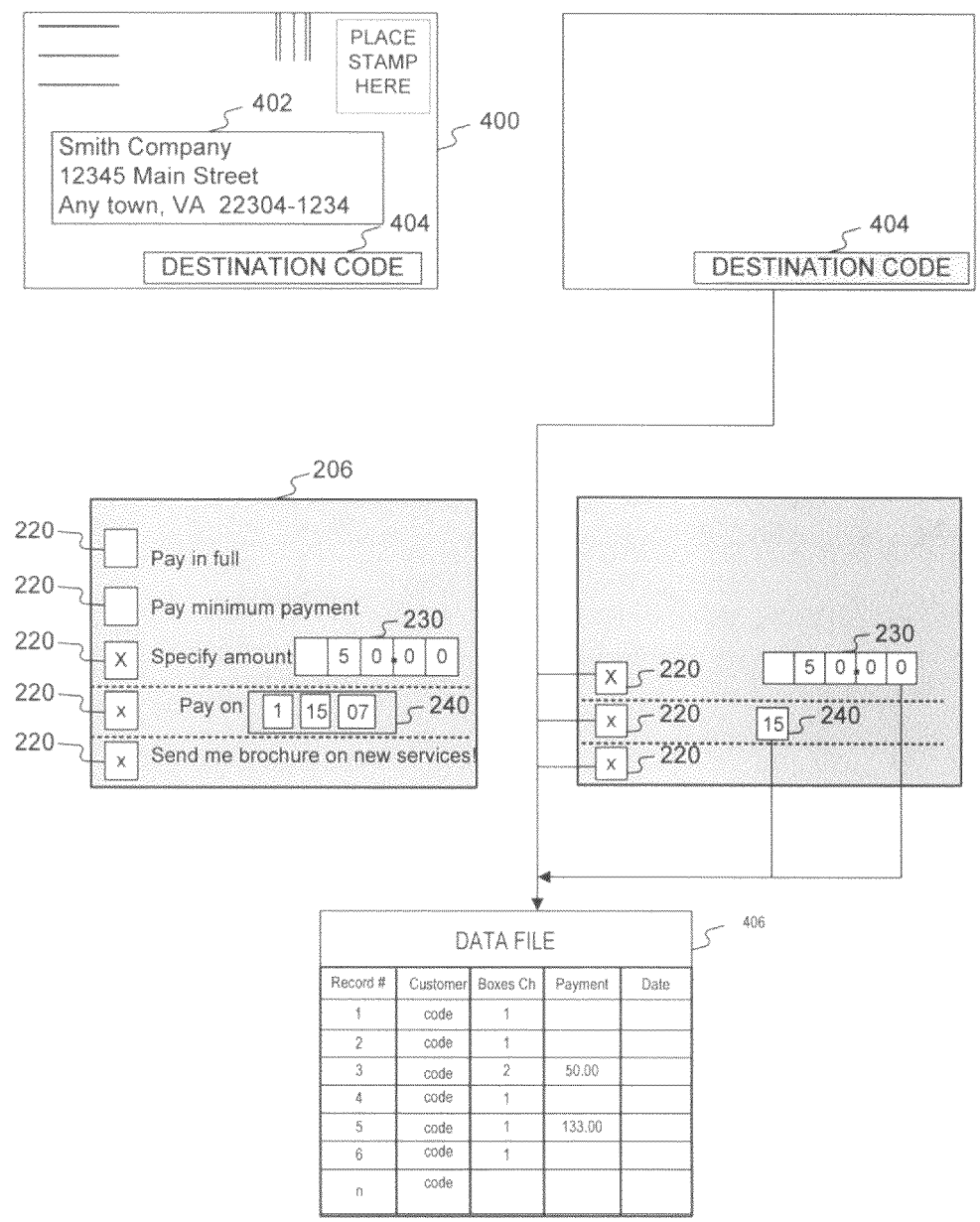
FIG. 4 is a diagram of an exemplary remittance stub, reply card, and data file.

In the embodiment described above, consumers 100 may tailor responses on remittance stub 206 by selecting choices that meet their needs. A skilled artisan will recognize that many alternative means and methods may be used to customize remittance stub 206. For example, remittance stub 206 may include data encoded at the bottom of the stub in an Optical Character Recognition (OCR) format. FIG. 4 illustrates an exemplary remittance stub 206 including OCR format data. The OCR format data may include, for example, checkboxes 220, amount 230, and date 240. As described above with respect to FIG. 2, in certain embodiments, a reply card 400 may also be used with remittance stub 206, for example on one side of remittance stub 206. Reply card 400 may also include OCR format data, such as a destination address 402 and a destination code 404, such as a barcode, ZIP CODE™, or ZIP+4 CODE™, for example.

As discussed in more detail below with respect to FIG. 5, delivery service provider 120 may scan data from reply card 400 and remittance stub 206 using an image capture machine, such as AFCM 124, to create data file 406. For example, an image of the front of reply card 400 may be captured using AFCM 124, and an image of the back of reply card 400 (e.g., remittance stub 206) may also be captured. In one embodiment, the image of the back of reply card 400 may be captured simultaneously with the image of the front of the reply card 400 (e.g., remittance stub 206). In certain embodiments, the images may be captured as soon as reply card 400 enters a provider processing center.

Data file 406 may include consumer account information related to biller 110. For example, if biller 110 is a particular magazine company, data file 406 may include all magazine subscriber account information. Information in data file 406 may come from various delivery service providers 120. For example, data file 406 may be created by consolidating data from reply cards 400 and remittance stubs 206 from geographically diverse locations. As shown in the embodiment depicted in FIG. 4, data file 406 may include a number of records, a list of customer account numbers, destination codes, and data relating to checkboxes 220, payment amount(s) 230, and date(s) 240.

In some embodiments, delivery service provider 120 may store data file 406 in a database, eliminating the need to archive hard copies of reply cards or remittance stubs. Biller 110 and financial institution 130 may access data file 406 via network 150, for example via the Internet. In certain embodiments, data file 406 may be available on demand to any third party. In some embodiments, the delivery service provider 120 may send a verification to a recipient subsequent to transmission of data record 406. Transmission of data file 406 may be scheduled to meet industry and processing deadlines (e.g., monthly magazine subscription payments).

Data file 406 may be available immediately, in real-time, or at a predetermined time. By making data file 406 available immediately, a recipient may take action as soon as it accesses the data, without the need for a hard copy or image of reply card 400 or remittance stub 206, for example. In one example, if consumer 100 pays a bill using remittance stub 206, financial institution 130 may start processing the payment based on the data received from the provider, even before receiving a hard copy or an electronic image of remittance stub 406. In some instances, the need for a paper check is eliminated. In yet another example, if consumer 100 designates a date 240 for payment to be withdrawn from an account, a recipient may estimate when payment will be received based on date 240, for example using data file 406.

Figure 5:
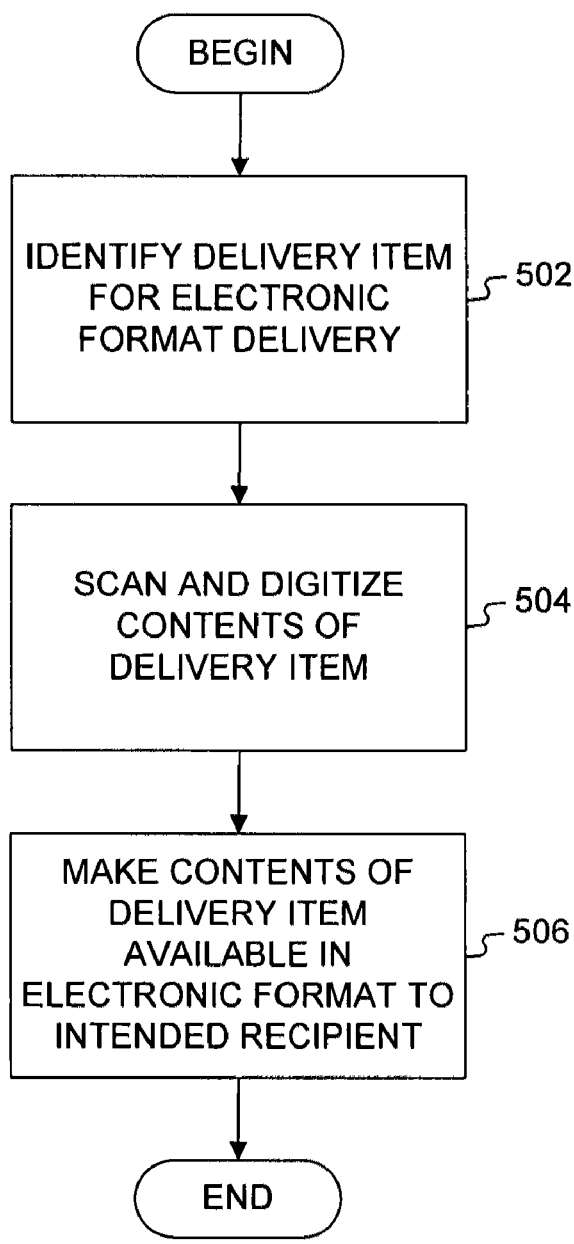
FIG. 5 is an exemplary flow chart for providing delivery items electronically.

FIG. 5 illustrates an exemplary flow chart for providing delivery items electronically. Delivery service provider 120 identifies delivery items (e.g., mail pieces, reply cards, remittances, etc.) destined for electronic format delivery (step 502). To distinguish delivery items for electronic format delivery from other delivery items, senders may provide a code on the delivery item envelope uniquely identifying that delivery item as designated for the electronic delivery. In some embodiments, barcodes, alphanumeric codes, or certain postal codes, such as ZIP CODES™, may be used in the destination address to signal to service provider 120 that a delivery item is designated for electronic format delivery.

Next, delivery service provider 120 scans and digitizes contents of the delivery item, for example using AFCM 124, a scanning system, an OCR system, or other methods known in the art (step 504). Once the contents of the delivery item are available in an electronic format, delivery service provider 120 makes the contents available to an intended mail recipient via an electronic delivery channel, such as sending the contents via e-mail, or posting the contents on a web-page, using network 150 (step 506).

Figure 6:
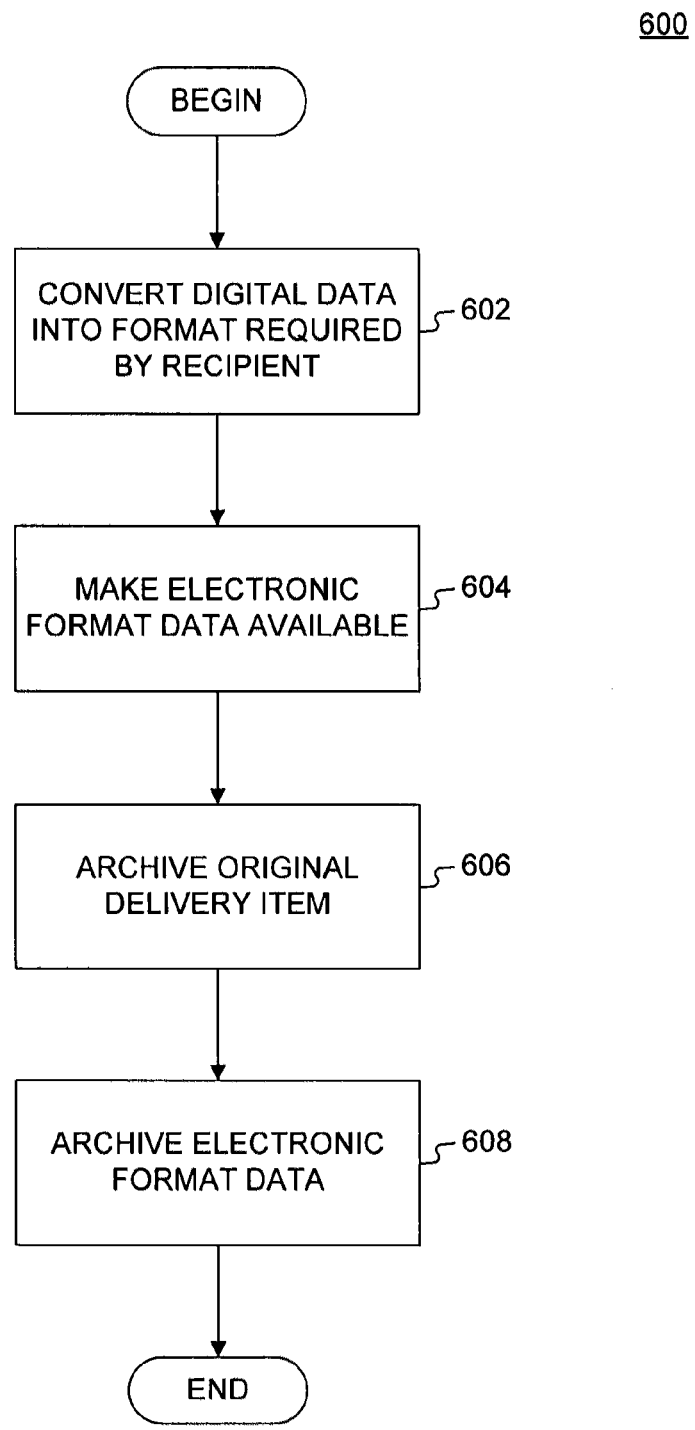
FIG. 6 is an exemplary flow chart for scanning and digitizing contents of a paper format delivery item.

FIG. 6 is an exemplary flow chart for delivering and archiving contents of a delivery item in an electronic format. To prepare an electronic image of a delivery item for electronic delivery, delivery service provider 120 or a third party provider, such as an image processing company, may use a digital image of the delivery item envelope where the name and address of an intended recipient may be listed. Having the name and address of the intended recipient may allow the provider to identify an electronic format (e.g., PDF, JPEG, RTF, etc.), in which that intended recipient requires his or her electronic mail to be delivered. In some embodiments, a default format (e.g., PDF) may be used.

Once the provider identifies an electronic format, it may convert the digitized image of the delivery item contents into electronic data (step 602). Then, the provider may make the electronic data available to the delivery item intended recipient (step 604). In one embodiment, a third party provider may e-mail the electronic data to the intended recipient. In another embodiment, the provider may make the electronic data available on a secure web site from which the intended delivery item recipient may retrieve the data.

After the intended recipient receives the electronic data, he or she may print, view, forward, or otherwise manage it. The provider may, in some embodiments, archive an original delivery item (e.g., paper mailpiece) at its facility (step 606). In another embodiment, the provider may forward an original delivery item to its intended recipient for filing or verification. In yet another embodiment, the provider may destroy the original delivery item.

A provider may also electronically archive the electronic data, for example using its own server (step 608). Archiving of an original delivery item and its electronic data versions may allow subsequent on-demand retrieval of the delivery item by recipients.

In yet certain embodiments, delivery service provider 120 may use its own employees to provide delivery items electronically, and use a third party provider to perform other processes. For example, an employee of delivery service provider 120 may open and scan paper delivery items to create digital data, and then tender the data to a third party for formatting, delivering, and archiving the data.

Figure 7:
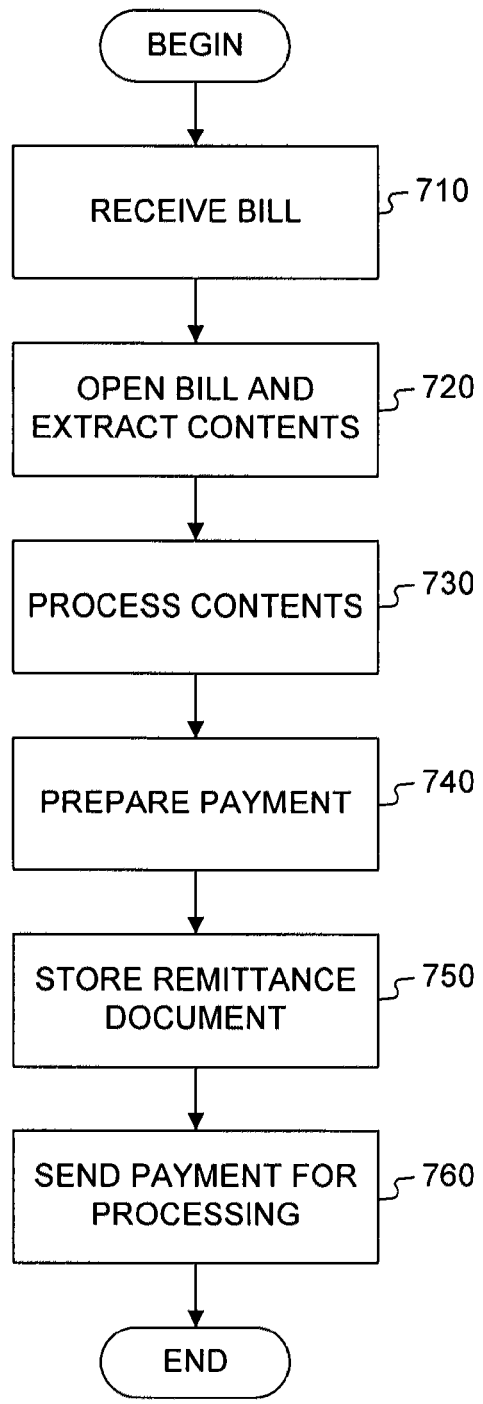
FIG. 7 is an exemplary flow chart for bill payment without a remittance stub.

FIG. 7 illustrates an exemplary process 700 for consumer bill payment. Consumer 100 may receive a bill (step 710), and may open the bill and extract its contents (step 720). The bill may be included in, for example, delivery item 200 described in detail above with respect to FIG. 2 (e.g., the bill may be remittance document 204). Consumer 100 may process the contents of the bill (step 730), for example by reviewing remittance document 204, and discarding or storing other contents 210. Consumer 106 may then prepare a payment (step 740), for example by writing a check and including the check with remittance document 204 in reply envelope 208 (which may be pre-addressed), or by filling out remittance stub 206. One skilled in the art will recognize many alternative methods exist for preparing a payment. In certain embodiments, consumer 100 may also store remittance document 204 (step 750). Consumer 100 may then send the payment (e.g., the check and remittance document 204 in reply envelope 208, remittance stub 206, or reply card 400) for processing (step 760), for example via the United States Postal Service™, to delivery service provider 120, biller 110, or to a biller's third-party agent for processing (e.g., financial institution 130).

Figure 8:
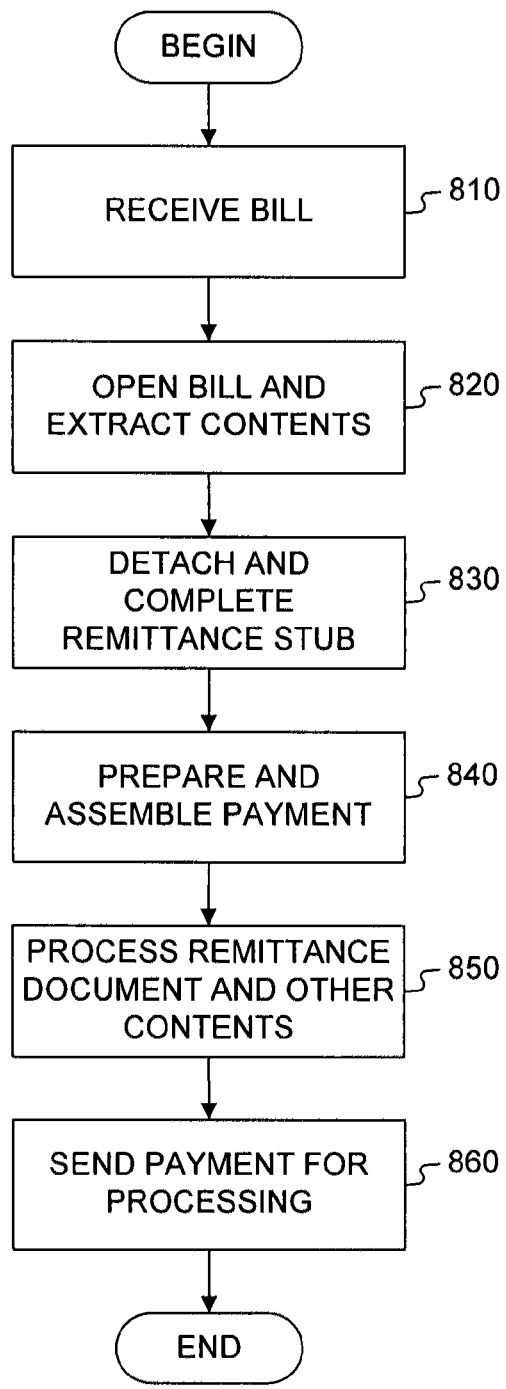
FIG. 8 is an exemplary flow chart for bill payment without a check.

FIG. 8 illustrates an alternative exemplary process 800 for bill payment without a check. As shown in FIG. 8, consumer 100 receives a bill (step 810), opens the bill and extracts its contents (step 820), and detaches and completes remittance stub 206 (step 830). Consumer 100 prepares and assembles a payment (step 840) by completing entries on remittance stub 206, for example. Consumer 100 may then process (e.g., store or discard) remittance document 204 and any other contents 210. Consumer 100 then sends the payment (e.g., remittance stub 206) for processing to a recipient (e.g., biller 110, financial institution 130, etc.) (step 860). In one embodiment, consumer 100 may use reply envelope 208 or other envelope to send remittance stub 206. In other embodiments, for example as shown in FIG. 4, one side of remittance stub 206 may be pre-addressed and stamped before consumer 100 receives remittance stub 206 (e.g., as reply card 400), so that consumer 100 may not need to use reply envelope 208 to send the payment.

Figure 9:
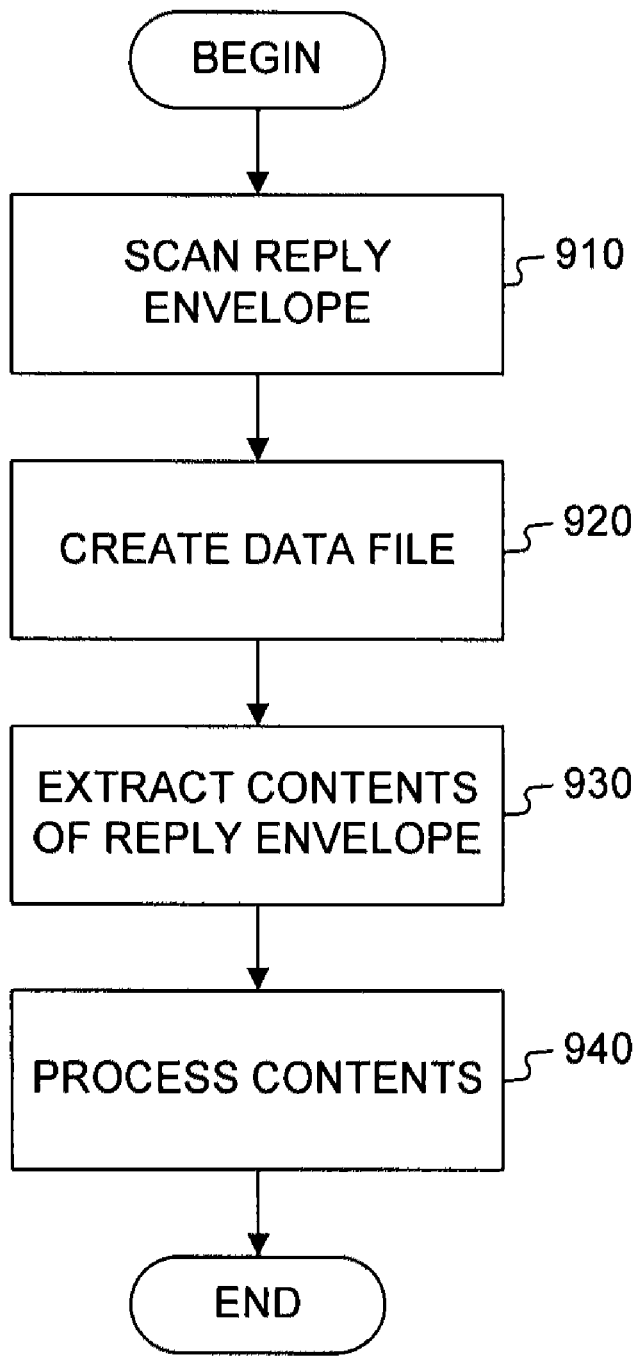
FIG. 9 is an exemplary flow chart for processing a bill payment.

FIG. 9 illustrates an exemplary flow chart for bill payment processing by a delivery service provider. As shown in FIG. 9, delivery service provider 120 scans reply envelope 208 (step 910) for example using AFCM 124. In alternative embodiments, delivery service provider 120 may scan reply card 400, as described above with respect to FIG. 4. Next, delivery service provider 120 creates data file 406 (step 920), and extracts the contents of reply envelope 208 (step 930), for example using remittance processor 122. In one embodiment, after extracting the contents from reply envelope 112, remittance processor 122 may shred and discard reply envelope 208, or may store or otherwise process reply envelope 208 (not shown).

Delivery service provider 120 then processes the extracted contents (step 940). The contents of reply envelope 208 may, in certain embodiments, include additional correspondence or other paper inserted by consumer 100 (not shown). The presence of any such additional correspondence may, in some embodiments, create an exception. If an exception is created, delivery service provider 120 may designate the payment for manual processing. In one embodiment, delivery service provider 120 may store copies or originals of the contents for some period of time, and later shred and discard the papers. A more detailed description for processing the extracted contents is described with respect to FIG. 10.

Figure 10:
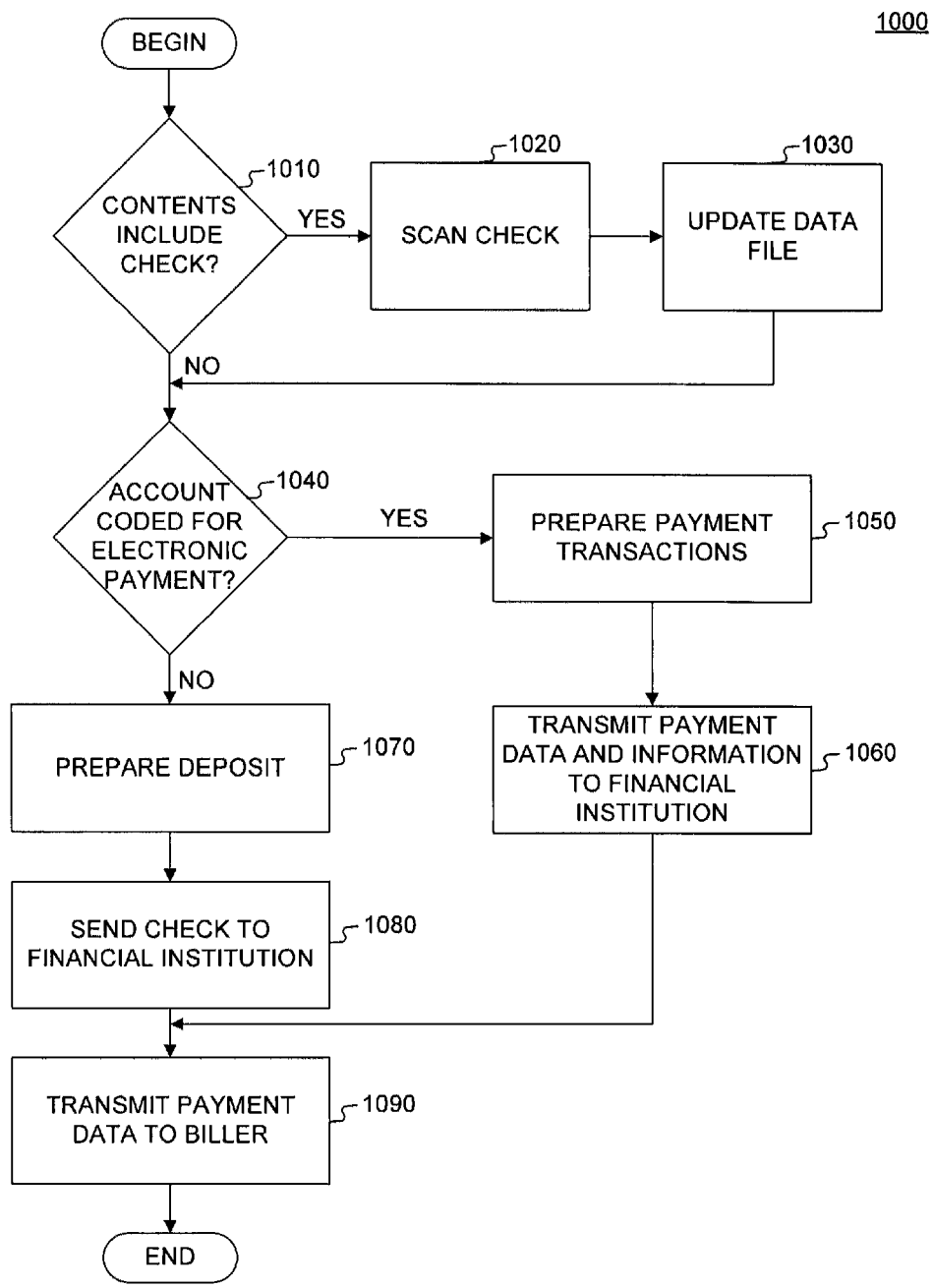
FIG. 10 is an exemplary flow chart for processing bill payment contents.

FIG. 10 illustrates an illustrates an exemplary flow chart for processing bill payment contents. A remittance processor 122, which may be located at delivery service provider 120, may determine whether the contents of a bill payment include a check from consumer 100 (step 1010), using, for example automated processing or manual processing techniques known in the art. If the contents include a check (step 1010, Yes), remittance processor 122 may scan the check (step 1020), for example using OCR and intelligent character recognition software to generate data in an electronic format (e.g., PDF, Word, JPEG, etc.). For example, an image processing machine may capture and store data in an OCR format from remittance stub 206 and data in a Magnetic Ink Character Recognition format from the check.

Remittance processor 122 may, in some embodiments, validate the check (not shown). To validate the check, remittance processor 122 may verify items on the check, such as whether the check is correctly payable to biller 110, whether the check is dated and signed, whether the numeric amount is equal to the written amount, etc. If remittance processor 122 finds the check invalid for any reason, the entire transaction may be directed to a semi-automated intervention, where an operator may assess the check and instruct remittance processor 122 how to proceed.

Remittance processor 122 updates date file 406 to include data from the scanned check (step 1030). Once data file 406 is updated, or if the contents do not include a check (step 1010, No), remittance processor 122 determines whether a consumer account is coded for electronic payment (step 1040). If the account is coded for electronic payment (step 1040, Yes), remittance processor 122 prepares the payment transaction (step 1050) and transmits the payment data and other information to financial institution 130 (step 1060).

If the account is not coded for electronic payment (step 1040, No), remittance processor 122 prepares a deposit (step 1070). In certain embodiments, to prepare the deposit, remittance processor may sort the check according to the financial institution upon which it is drawn. For example, remittance processor 122 may sort the check by a bank number, such as a Bank Routing Transit Number. Then, remittance processor 122 may prepare a deposit ticket for the check, and send the check to the appropriate financial institution (step 1080), for example using a courier service. In one alternative embodiment, the check may be entered into a check clearing network for presentment to each consumer's bank. A skilled artisan will recognize that many other means and methods may be used to process checks.

Remittance processor 122 may also transmit certain payment data (e.g., amount of payment, time, date, consumer preferences and selections from remittance stub 206, etc.) to biller 110 (step 1090), for example to update consumer 100's account. In one alternative embodiment, remittance processor 122 may transmit the payment data to an Automated Clearing House (ACH) processor. An ACH network is a part of nationwide electronic funds transfer system governed by the NACHA's operating rules that authorize inter-bank clearing of electronic payments. The ACH network may present the transaction to a consumer's financial institution, where the amount of the payment may be debited from the consumer's account. The total payment amount may then be presented to the biller's depository financial institution so that it may be attributed to the biller's account. In one embodiment, when remittance processor 122 transmits the data to an ACH network, a computer application or other system may sort the data in the transaction by financial institution, and transmit the transaction to an Originating Depository Financial Institution to enter the data into the ACH network.

Other embodiments will be apparent to those skilled in the art from consideration of the specification and practice of the embodiments disclosed herein. For example, a consumer may authorize a biller to debit the consumer's account upon receipt and processing of remittance stub. The authorization may be established in advance, and may entitle the biller to either debit the consumer's account, or authorize the consumer's financial institution to initiate a credit to the biller's account. As each remittance stub is received, the biller may decide whether to credit or debit the account, using, for example, the process regulated by NACHA. Any authorization on file for the consumer may allow the remittance processor to create the necessary transactions to process the payment, and, in effect, transfer funds from the consumer's account to the biller.

What is claimed is:

1. A method for automatically processing a remittance by a delivery service provider, comprising:
    receiving a delivery item at a delivery processing center of the delivery service provider;
    determining, by a processor, whether an account associated with the delivery item is designated for electronic delivery by recognizing a code indicating that the delivery item is designated for electronic delivery on the outside of the delivery item before the delivery item is opened;
    scanning, by a scanning system, inside contents of the delivery item after the determining that the account associated with the delivery item is designated for electronic delivery, wherein the inside contents include a remittance document;
    determining, by the processor and based on the scanning of the inside contents of the delivery item, whether the account associated with the delivery item is coded for electronic payment;
    identifying, by the processor and based on the determining that the account is not coded for electronic payment, items within the inside contents of the delivery item that are designated for financial institutions;
    converting, by the processor, the scanned inside contents into electronic data; and
    making the electronic data available to a biller, by the processor, while the delivery service provider possesses the delivery item.

2. The method of claim 1, wherein the remittance document includes at least one of: a remittance stub, a check, or account data provided by a consumer.

3. The method of claim 1, wherein the delivery item comprises a reply card.

4. The method of claim 1, wherein making the electronic data available to the biller comprises:
    presenting the electronic data on a website via a network; and
    sending a notification to the biller that the electronic data is available on the website.

5. The method of claim 1, wherein making the electronic data available to the biller comprises:
    sending an e-mail to the biller including the electronic data.

6. The method of claim 1, wherein scanning contents of delivery item comprises:
    capturing data from the remittance document, wherein the data includes at least one of: a date, a payment amount, or an account number.

7. The method of claim 1, further comprising:
    opening an envelope of the delivery item.

8. The method of claim 1, wherein a format of the electronic data is designated by the biller.

9. The method of claim 1, further comprising:
    updating a consumer's account based on the electronic data.

10. The method of claim 1, further comprising:
    sorting, by the processor, the identified items according to the designated financial institutions; and
    preparing, by the processor, at least one deposit ticket based on the sorted identified items for sending to at least one of the financial institutions.

11. A method for automatically processing a bill payment by a delivery service provider at a delivery processing center, comprising:
    determining, by a processor, whether an account associated with a delivery item is designated for electronic delivery by recognizing a code on the outside of the delivery item before the delivery item is opened;
    capturing inside contents of a delivery item by a scanning system of the delivery service provider after the determining that the account associated with the delivery item is designated for electronic delivery;
    determining, by the processor and based on the capturing of the inside contents of the delivery item, whether the account associated with the delivery item is coded for electronic payment:
    creating, by the processor, a data file including the captured inside contents;
    extracting the inside contents of the delivery item, wherein the inside contents include a check;
    capturing data from the check;
    updating, by the processor, the data file based on the captured data from the check; and
    providing the data file in an electronic format to an intended recipient, by the processor, while the delivery service provider possesses the delivery item.

12. The method of claim 11, wherein providing the data file in an electronic format to an intended recipient comprises:
presenting the data file on a website via a network; and
sending a notification to the intended recipient that the data file is available on the website, wherein the intended recipient is one of: a biller or a financial institution.

13. The method of claim 11, wherein providing the data file in an electronic format to an intended recipient comprises:
sending an e-mail to the intended recipient including the data file.

14. The method of claim 11, wherein capturing contents of the delivery item by a scanning system comprises:
using optical character recognition software to scan at least one of: a date, a payment amount, and an account number associated with a sender of the delivery item.

15. The method of claim 11, further comprising validating the check prior to updating the data file.

16. The method of claim 11, wherein the electronic format is designated by the biller.

17. The method of claim 11, further comprising:
updating a consumer's account based on payment data associated with the data file.

18. A system for automatically processing a remittance by a delivery service provider, comprising:
a sorting machine configured to receive a delivery item at a delivery processing center of the delivery service provider;
a processor configured to determine whether an account associated with the delivery item is designated for electronic delivery, by recognizing, before the delivery item is opened, that a code on the outside of the delivery item signifies an electronic delivery; and
a scanning subsystem configured to scan inside contents of the delivery item after determining that the account associated with the delivery item is designated for electronic delivery, the inside contents including a remittance document;
wherein the processor is configured to:
determine, based on the scanning subsystem scanning the inside contents of the delivery item, whether the account associated with the delivery item is coded for electronic payment:
identify items within the inside contents of the delivery item that are designated for financial institutions;
convert the scanned inside contents into electronic data; and
make the electronic data available to a biller while the delivery service provider possesses the delivery item.

19. A tangible non-transitory computer-readable medium including instructions which, when executed on a processor, perform a method for automatically processing a remittance by a delivery service provider, the method comprising:
receiving a delivery item at a delivery processing center of the delivery service provider;
determining whether an account associated with the delivery item is designated for electronic delivery by recognizing a code on the outside of the delivery item before the delivery item is opened;
scanning inside contents of the delivery item after the determining that the account associated with the delivery item is designated for electronic delivery, the inside contents including a remittance document;
determining, based on the scanning of the inside contents of the delivery item, whether the account associated with the delivery item is coded for electronic payment;
identifying, based on the determining that the account is not coded for electronic payment, items within the inside contents of the delivery item that are designated for financial institutions;
converting the scanned inside contents into electronic data; and
making the electronic data available to a biller while the delivery service provider possesses the delivery item.

* * * * *